Oct. 16, 1962  R. C. PRIMEAU  3,058,392
BISIGHT SPECTACLES
Filed Nov. 23, 1959
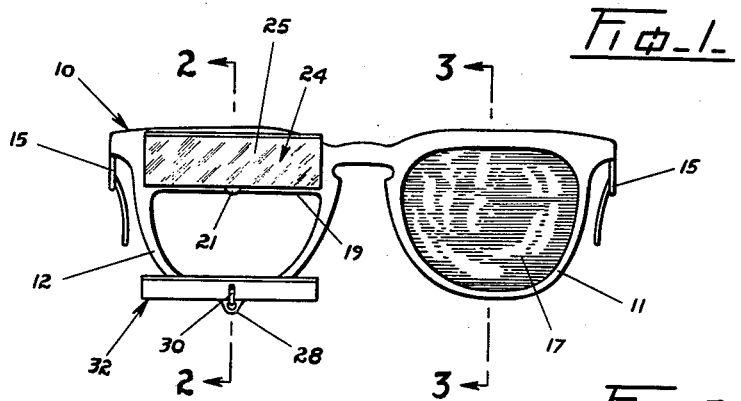
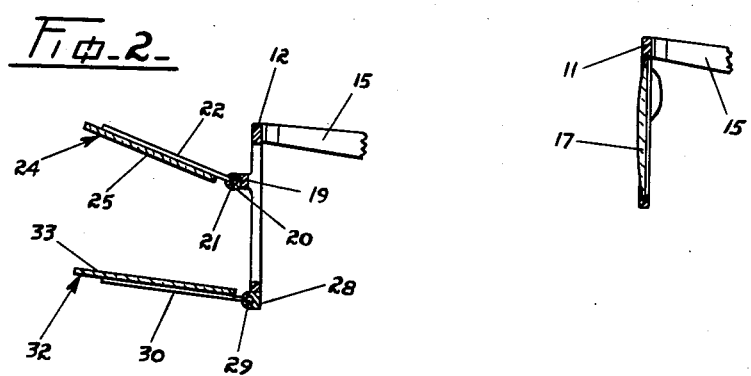
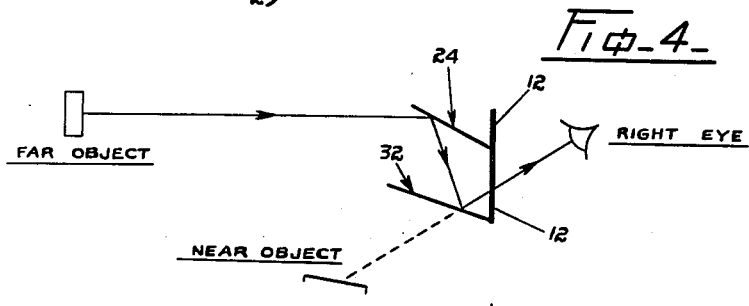
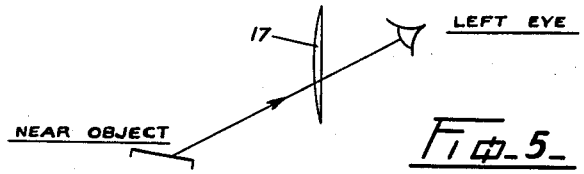
INVENTOR
RICHARD C. PRIMEAU
by Carver & Co.
Hugo Ray
ATTORNEY 3,058,392
BISIGHT SPECTACLES
Richard C. Primeau, 1359 SW. Marine Drive,
Vancouver 14, British Columbia, Canada
Filed Nov. 23, 1959, Ser. No. 854,789
1 Claim. (Cl. 88—41)

My invention relates to improvements in bisight spectacles.

There are many occupations and tasks which require a person continually to shift his gaze from an object or scene located at a distance to one located close at hand. For example a musician in an orchestra must pay strict attention to his musical score and at the same time endeavour to watch the movements of the conductor. In order to do this the musician finds it necessary to be constantly raising and lowering his head and eyes with the result that he is subjected to undue fatigue and the quality of his music will sometimes suffer since he is apt to miss a cue from the conductor or lose his place in the score. Another person who is faced with a similar problem is the student in the classroom who is required to copy notes from a blackboard. It has been found that during a task of this nature many students experience eye strain to such a degree that numerous errors will occur in their notes.

The objects of the present invention therefore are to provide spectacles which will enable a person simultaneously to view two scenes, one of which may be disposed at a distance along one line of sight and the other located close at hand along a different line of sight.

A further and important object is to provide spectacles which are useful in the field of visual training for the improvement of such functions as binocular perception and accommodative facility.

Referring to the accompanying drawings:

FIGURE 1 is a front elevation of the invention.

FIGURE 2 is a vertical section taken on the line 2—2 of FIGURE 1.

FIGURE 3 is a vertical section taken on the line 3—3 of FIGURE 1.

FIGURES 4 and 5 are diagrammatic views showing the effect of the glasses on the right eye and the left eye respectively.

In the drawings like characters of reference indicate corresponding parts in each figure.

The numeral 10 indicates generally a suitable spectacle frame having a left lens holder 11 and a right lens holder 12. A pair of hingedly mounted temple bars 15 are provided on the frame 10 in the usual manner. The left lens holder 11 is fitted with a compensating lens 17, the purpose of which will later appear. Extending across the right holder 12, which in this instance is not fitted with a lens, is a horizontal bar 19 and mounted upon said bar is a centrally disposed semi-spherical socket 20, see particularly FIGURE 2. A ball 21 is housed within the socket 20, and extending outwardly from said ball is a rod 22 which is suitably secured to a substantially rectangular upper mirror 24 having a reflecting surface 25. On the lower portion of the holder 12 and in vertical alignment with the socket 20, a similar socket 28 is mounted and this latter socket is fitted with a ball 29 supporting a rod 30, see also FIGURE 2. The rod 30 is secured to rectangular lower mirror 32 which has its reflecting surface 33 disposed uppermost or in opposed relation to the surface 25 of the mirror 24.

While the mirrors 24 and 32 have been described as being universally mounted upon the right lens holder 12 it will be obvious that they could be similarly mounted upon the left holder 11 in which case the right holder would be used to support the compensating lens 17.

It will be noted that the above described spectacles are intended for use by a person having adequate vision in both eyes. Should the user normally wear corrective glasses both the holders 11 and 12 would support lenses ground to the wearer's prescription and incorporated into the left lens would be the compensating factor previously referred to and designed to provide suitable accommodative balancing power.

Assuming that the spectacles are being worn by a technician whose work it is to keep a written record of the readings of an instrument located on a remotely situated panel, then the device will function as follows:

The wearer may be seated at a desk with the chart directly before him and while thus seated he will position his head so that he may conveniently view the page on which he is to write. Without moving his head the user will manually adjust the angularity of both the upper and lower mirrors so that a clear image of the instrument or far object is received by the right eye. This instrument image is projected by the right eye on to the page or near object and by adjustment of the two mirrors the image may be superimposed directly upon the page or alternately said image may be placed to one side of the page in whatever position the user finds most convenient in which case slight shifting of the eyes may be necessary as the instrument readings are recorded. At this time both eyes are directed at the near object and are focused thereon or in other words the right eye is not accommodating for the far object. The left eye, looking at the near object is required to accommodate for the short distance at which said object is spaced and normally this could not be done without putting the right eye out of focus since obviously both eyes must accommodate an equal amount at all times. However the compensating lens 17 before the left eye provides the necessary accommodation that this eye requires so that both eyes are relaxed and in focus. As an example of the type of compensating lens which might be used in bisight spectacles it could be assumed that the right eye was looking indirectly, or through the mirrors, at an object located approximately 25 feet away in which case no accommodation is required by the right eye. The left eye, at this time, could be looking at the chart located 20 inches away so that a +2 diopter lens placed before the left eye would balance the accommodative effort of both eyes.

The technician wearing the bisight spectacles gazes at the chart on which he is to make his notations and at the same time has an unobstructed view of the instrument dial so that he is able to record the instrument readings without movement of his head and with little or no movement of his eyes.

What I claim as my invention is:

Bisight spectacles for simultaneously viewing a near object and a far object, said spectacles comprising a frame, one side of the frame being fitted with a compensating lens, the other side of the frame having an upper mirror and a lower mirror, said upper and lower mirrors extending outwardly of the frame and being adjustably secured thereto by centrally disposed vertically aligned universal mountings, said upper and lower mirrors coacting to present an image of the far object to one eye of the wearer and said compensating lens presenting an image of the near object to the other eye, the mirrors being adjustable to direct the image forming rays to said one eye in substantially the same direction as the rays received by the other eye, said compensating lens being such that the other eye of the wearer may view the near object without accommodation.

References Cited in the file of this patent

UNITED STATES PATENTS

| | | |
|---|---|---|
| 1,987,821 | Gordon | Jan. 15, 1935 |
| 2,523,975 | Thomas | Sept. 26, 1950 |

FOREIGN PATENTS

| | | |
|---|---|---|
| 20,390 | Great Britain | of 1907 |
| 915,142 | France | July 16, 1946 |